(12) United States Patent
Scherkowski

(10) Patent No.: US 12,521,538 B2
(45) Date of Patent: Jan. 13, 2026

(54) HAND-HELD MICRONEEDLING DEVICE FOR LOCAL PUNCTURING OF A SKIN, SKIN PUNCTURING DEVICE, AND ITEM

(71) Applicant: MT.DERM GmbH, Berlin (DE)

(72) Inventor: Dirk Scherkowski, Berlin (DE)

(73) Assignee: MT.DERM GMBH, Berlin (DE)

( * ) Notice: Subject to any disclaimer, the term of this patent is extended or adjusted under 35 U.S.C. 154(b) by 885 days.

(21) Appl. No.: 17/695,914

(22) Filed: Mar. 16, 2022

(65) Prior Publication Data

US 2022/0323735 A1 Oct. 13, 2022

(30) Foreign Application Priority Data

Apr. 13, 2021 (EP) ..................................... 21168112

(51) Int. Cl.
*A61M 37/00* (2006.01)
*A61B 17/00* (2006.01)

(52) U.S. Cl.
CPC ..................... *A61M 37/0015* (2013.01); *A61B 2017/00747* (2013.01)

(58) Field of Classification Search
CPC .............. A61M 37/0015; A61M 37/00; A61B 2017/00747; A61C 17/16; A61C 17/22
USPC ........................................................ 604/173
See application file for complete search history.

(56) References Cited

U.S. PATENT DOCUMENTS

| | | | |
|---|---|---|---|
| 9,636,491 B1 | 5/2017 | O'Brien, III | |
| 2014/0018835 A1 | 1/2014 | Scherkowski et al. | |
| 2015/0088050 A1 | 3/2015 | Chang et al. | |
| 2017/0056145 A1 | 3/2017 | Sedic | |

(Continued)

FOREIGN PATENT DOCUMENTS

| | | |
|---|---|---|
| DE | 202004010659 U1 | 10/2004 |
| DE | 102016003599 A1 | 9/2017 |
| WO | 2007122611 A2 | 11/2007 |

OTHER PUBLICATIONS

European Search Report for EP Application No. EP23173294, dated Jul. 13, 2023 (7 pages).
European Search Report for EP Application No. 22162404.2 dated Sep. 6, 2022.
European Search Report for EP Application No. 22162406.7 dated Sep. 21, 2022.

*Primary Examiner* — Phillip A Gray
(74) *Attorney, Agent, or Firm* — Leason Ellis LLP

(57) ABSTRACT

The invention relates to a hand-held microneedling device (1; 20) for local puncturing of a skin, comprising a housing (2); a drive device which is arranged in the housing (2) and is configured to provide a drive force; a skin puncturing device (6); a microneedling puncturing tool (8) which is formed on the skin puncturing device (6) and is connected to the drive device such that, during operation, the microneedling puncturing tool (8) can be moved back and forth at a repetition rate by means of the drive force; and a needle plate (9) which is formed on the microneedling puncturing tool (8) and on which a plurality of puncturing needles (10) are arranged distributed over a front-side application surface (11); wherein, during operation, the microneedling puncturing tool (8) can be moved back and forth, between a front working position and a rear working position which is retracted in comparison thereto, by means of the drive force at the repetition rate. Furthermore, a skin puncturing device (6) for a hand-held microneedling device and an article are provided.

11 Claims, 14 Drawing Sheets

(56) References Cited

U.S. PATENT DOCUMENTS

2017/0354810 A1 12/2017 O'Brien, III et al.
2019/0351205 A1 11/2019 Ford et al.
2021/0005372 A1* 1/2021 Laufenberg ............. H01F 1/083

* cited by examiner

HAND-HELD MICRONEEDLING DEVICE FOR LOCAL PUNCTURING OF A SKIN, SKIN PUNCTURING DEVICE, AND ITEM

CROSS-REFERENCE TO RELATED APPLICATIONS

This application claims priority to European Patent Application No. 21168112.7, filed Apr. 13, 2021, the contents of which is hereby incorporated by reference in its respective entirety.

The invention relates to a hand-held microneedling device for local puncturing of a skin, to a skin puncturing device for a hand-held microneedling device, and to an item.

BACKGROUND

In microneedling, the skin is punctured locally with a plurality of puncturing needles simultaneously in a flat portion of skin. The plurality of puncturing needles are arranged distributed over an application surface on a microneedling puncturing tool of a hand-held device, for example on a needle plate.

Due to the local puncturing, microneedling causes extremely fine injuries to the skin which the skin registers as wounds. Various messenger substances and growth factors are then released in the skin to stimulate wound healing. This process also stimulates the production of collagen, elastin, and hyaluronic acid, which promote skin firmness and elasticity. Microneedling can be carried out with or without the introduction of a substance or active ingredient into the skin. The skin is locally punctured in order to trigger positive healing reactions, which can optionally be supported by the application of substances.

For example, manual skin puncturing devices in a stamp-like design are known for applying microneedling, in which the microneedling puncturing tool is formed with a stamp on which a plurality of puncturing needles are arranged distributed over an application surface. In other manual hand-held devices, the puncturing needles are distributed over the lateral surface of a roller that is rolled over the skin for local puncturing of the skin.

Furthermore, hand-held microneedling devices are known in the form of a pen in which a microneedling puncturing tool of a skin puncturing device is formed with a needle plate on which a plurality of puncturing needles are arranged in the region of an application surface. The microneedling puncturing tool is moved back and forth in an automated manner with the aid of an electric motor of a drive device. The electric motor of the drive device provides a drive force which is coupled to the microneedling puncturing tool in order to move the needle plate having the application surface and the puncturing needles distributed over the surface back and forth such that the needle tips of the puncturing needles are moved back and forth in relation to a front-side housing opening of a housing of the hand-held device between an extended and a retracted position. A needle plate on which the puncturing needles are arranged is surrounded by a front housing portion. A front-side edge of the housing portion, which edge surrounds the housing opening through which the needle tips of the puncturing needles are extended and retracted, is placed on the skin surface during operation, which skin surface is thereby fixed in the region of application, in order then to locally puncture the (tensioned) skin surface by moving the needle tips back and forth. The edge surrounding the front-side housing opening is used in this case to fix and hold the portion of skin in place, which portion of skin is then locally punctured by means of the puncturing needles on the needle plate.

SUMMARY

The object of the invention is to specify a hand-held microneedling device for local puncturing of a skin, which device allows improved application of microneedling.

The object is achieved by a hand-held microneedling device for local puncturing of skin.

According to one aspect, a hand-held microneedling device for local skin puncturing is provided, comprising: a housing; a drive device which is arranged in the housing and is configured to provide a drive force; a skin puncturing device which is arranged in the housing; a microneedling puncturing tool which is formed on the skin puncturing device and is connected to the drive device such that, during operation, the microneedling puncturing tool can be moved back and forth by means of the drive force at a repetition rate; and a needle plate which is formed on the microneedling puncturing tool and on which a plurality of puncturing needles are arranged distributed over a front-side application surface. During operation, the microneedling puncturing tool can be moved back and forth, by means of the drive force at the repetition rate, between a front working position and a rear working position which is retracted in comparison to the front working position.

According to a further aspect, a skin puncturing device having a housing is provided, which skin puncturing device can be coupled to a drive device to form a hand-held microneedling device and comprises the following: a microneedling puncturing tool which is formed on the skin puncturing device and can be connected to the drive device such that, during operation, the microneedling puncturing tool can be moved back and forth by means of a drive force provided by the drive device at a repetition rate; and a needle plate which is formed on the microneedling puncturing tool and on which a plurality of puncturing needles are arranged distributed over a front-side application surface. The microneedling puncturing tool can be moved back and forth between a front working position and a rear working position which is retracted in comparison to the front working position, wherein at least the plurality of puncturing needles of the needle plate in the front working position and the rear working position of the microneedling puncturing tool are arranged entirely outside the housing and are thus arranged in an exposed manner.

According to a further aspect, an article is provided, comprising: a drive device which is arranged in a housing which is optionally configured to form a handpiece; a toothbrush attachment which can be detachably connected to the housing and thus coupled to the drive device to form an electric toothbrush; and a skin puncturing device which can be detachably connected to the housing and thus coupled to the drive device to form a hand-held microneedling device.

In one embodiment, when moving between the front working position and the rear working position, at least the plurality of puncturing needles of the needle plate in the front working position and the rear working position of the microneedling puncturing tool may be arranged entirely outside the housing and can be thus arranged in an exposed manner. The hand-held microneedling device is configured such that further improved microneedling is possible. Since at least the plurality of puncturing needles of the needle plate on the microneedling puncturing tool in the front working position as well as in the rear working position are arranged entirely outside the housing, which housing is optionally formed in one or in several parts, and are arranged in particular outside a housing component of the skin puncturing device and are thus arranged in an exposed manner, the local portion of skin to be punctured is itself caused to vibrate due to the repetitive movement of the needle plate having the plurality of puncturing needles, i.e. it is thus not prevented from doing so by the housing of the hand-held microneedling device, thereby allowing the plurality of puncturing needles to be punctured into the skin efficiently and as painlessly as possible.

During operation, at least the front-side application surface, both in the front working position and in the retracted rear working position of the microneedling puncturing tool, can be arranged entirely outside the housing and can thus be arranged in an exposed manner, in particular outside a housing interior that is at least partially surrounded by housing portions of the housing. In this way, the hand-held microneedling device is additionally configured to allow the treated portion of skin to vibrate freely during operation during microneedling.

In alternative embodiments of the microneedling puncturing tool, the needle plate can be formed without a housing portion of the housing that at least partially encompasses the needle plate.

The needle plate can be arranged on a housing portion of the housing, which housing portion is moved together with the microneedling puncturing tool when said microneedling puncturing tool is moved back and forth during operation. This can be a front housing part of the housing. In this case, the needle plate can be formed on an outer side of the housing portion with which the application surface is provided. The needle plate can be formed on a front housing portion of the housing, which during operation is moved back and forth together with the microneedling puncturing tool. For example, the needle plate can be formed as a front plate of the housing portion. The needle plate can be detachably or non-detachably arranged on the housing portion.

The needle plate can be integrally formed on the housing portion of the housing. In this case, a lateral wall portion of the housing portion can be configured to be integral with a front plate providing the application surface. The housing portion can thus be configured to form the microneedling puncturing tool, in particular the needle plate.

In various embodiments, the plurality of puncturing needles can be attached to the needle plate in the region of the application surface. Alternatively, it can be provided that the puncturing needles are arranged in openings in the needle plate, for example soldered or glued in place, it being possible for the puncturing needles to extend at least in portions through the openings. It can be provided that the puncturing needles, after passing through the openings, are received on a needle holder element positioned on the rear side in relation to the application surface of the needle plate which can be formed as part of the microneedling puncturing tool or the needle plate.

Alternatively, the puncturing needles can be integrally formed on the needle plate. For example, the puncturing needles can be formed by means of stamped and bent sheet metal elements.

Puncturing needles within the meaning of the present disclosure are generally sharp or pointed volume elements protruding from the needle plate, which are configured in terms of shape and strength for repeated penetration of the skin. The puncturing needles can be made of a solid material, in contrast to a cannula (hollow needle).

A front housing part which is associated with the skin puncturing device can be provided in the form of a sleeve at the rear and can at least partially enclose or encompass a rear housing part which is associated with the drive device. In this or other embodiments, a housing component of the skin puncturing device, for example a module housing of a puncturing module, can be formed with the front housing part which can be removable from the rear housing part.

The skin puncturing device can be detachably arranged on the housing. In this manner, the microneedling puncturing tool can be arranged on the housing with an associated housing part in an exchangeable manner.

The drive device can be formed with a drive device for an electric toothbrush, which drive device is configured to be optionally detachably coupled to the skin puncturing device or to a toothbrush attachment that can be operated by means of the drive device. Drive devices for electric toothbrushes are known as such in various designs. The housing of the drive device often forms a handpiece of the electric toothbrush, which handpiece the user grips during use. The drive device provides a drive force/movement for the electrical operation of the toothbrush attachment. The toothbrush attachment is removable. The drive device of the electric toothbrush can then be used to form the hand-held microneedling device in that the skin puncturing device is detachably fitted on the drive device of the electric toothbrush so that the drive force provided can be introduced onto the microneedling puncturing tool such that, during operation, the microneedling puncturing tool is moved back and forth by means of the drive force at a repetition rate.

The microneedling puncturing tool together with the housing portion can be detachable or removable from the housing. The microneedling puncturing tool and/or the skin puncturing device having the microneedling puncturing tool, either separately or together with the housing portion, can be detachably mounted by means of a plug connection or a screw connection. Thus, the microneedling puncturing tool together with the housing portion can be plugged onto an associated housing portion, in particular a housing portion that receives the drive device.

The microneedling puncturing tool can be displaced through an opening at a front-side housing end of the housing into a non-working position which is further retracted in comparison with the retracted rear working position, in which non-working position at least the front-side application surface of the needle plate is retracted in relation to the opening. In this embodiment, during non-operation, the microneedling puncturing tool can be displaced into the retracted non-working position, for example such that the plurality of puncturing needles are arranged behind an opening surface of the (housing) opening at the front-side housing end and are thus protected by the housing.

Alternatively or additionally, in this or other embodiments, it can be provided that a protective cap is detachably fitted on the front-side housing end. The housing can partially or entirely surround the opening. In the retracted, non-working position, the needle plate can be partially or entirely surrounded by the housing so that the needle plate is then arranged in the housing interior.

When displaced through the (housing) opening, the needle plate can be at a distance on one or more sides from an edge surrounding the opening. In this embodiment, the needle plate is displaced without contact through the opening, in the spacing regions formed on one or more sides. In particular, there is thus no guidance of the needle plate on the housing in the spacing regions. The spacing between the needle plate and the surrounding housing can be configured to be continuous around the needle plate.

In the further retracted non-working position, the needle plate can be arranged in an exposed manner at a distance from the housing portions of the housing surrounding the needle plate. In this case, the needle plate is arranged without contact in the further retracted non-working position.

The hand-held microneedling device can be formed with a reusable drive module in which the drive device is arranged and with a disposable module which is detachably connected to the drive module and in which the skin puncturing device is arranged. The drive module and the disposable module may be formed with a respectively associated module housing, it being possible for the module housings to be detachably coupled or connected to one another.

The drive device can be configured to move the microneedling puncturing tool back and forth during operation by means of the drive force introduced thereupon at a repetition rate of between approximately 10 Hz and approximately 200 Hz, alternatively at a repetition rate of between approximately 25 Hz and approximately 160 Hz.

It can be provided that a distance (working stroke length) of approximately 0.5 mm to approximately 5 mm is formed in the longitudinal direction of the hand-held microneedling device between the front working position and the rear working position which is retracted in comparison thereto. Alternatively, it can be provided that a distance (working stroke length) of only approximately 1 mm to approximately 4 mm is formed in the longitudinal direction of the hand-held microneedling device between the front working position and the rear working position which is retracted in comparison thereto. The hand-held microneedling device can be configured for different applications by means of different stroke lengths, for example for medical or cosmetic microneedling.

A protective or cover cap can be provided for the hand-held microneedling device, which cap is detachably arranged on the housing and covers the needle plate, with a functional tool being arranged on the outside of the protective cap. For example, a plurality of skin massage projections can be arranged on the outside of the protective cap, in particular in the region of a front surface, which skin massage protrusions are arranged distributed over the outer surface of the protective cap. For example, the skin massage protrusions can have a rounded head part, such as a ball head.

A functional tool is thus arranged on the cover cap which covers the puncturing needles when it is in place, which functional tool can be formed with an arrangement of functional elements which are, for example, massage elements. The cover cap can thus be configured as a multifunctional cap.

Openings can be provided on the cover cap. For example, the openings are arranged in the region of a lateral surface of the cover cap and thus form lateral openings. Alternatively or additionally, in other embodiments, such openings can be arranged in the region of the front surface. For example, the openings can be used to carry out gas sterilization for the needle plate having the plurality of puncturing needles when the cover cap is in place. Lateral openings have the advantage that the ingress of dust particles to the needle plate and the dust deposits caused thereby are reduced.

In one embodiment, the needle plate can be configured with a reversible plate or a reversible insert, such that, for example, different microneedling puncturing tools can be arranged thereon in an exchangeable or detachable manner in order to provide different (microneedling) functions and/or to compensate for wear on the puncturing tool. These can also be interchangeable inserts that are detachably arranged on the needle plate depending on the desired application. Reversible inserts can carry puncturing tools on both sides. The interchangeable inserts can be selected from an assortment or a graded set of tool properties.

The embodiments explained above in connection with the hand-held microneedling device can be provided accordingly in connection with the skin puncturing device and/or the article.

DESCRIPTION OF THE EMBODIMENTS

Further embodiments are explained below with reference to Figures of a drawing, in which.

Figure 1:
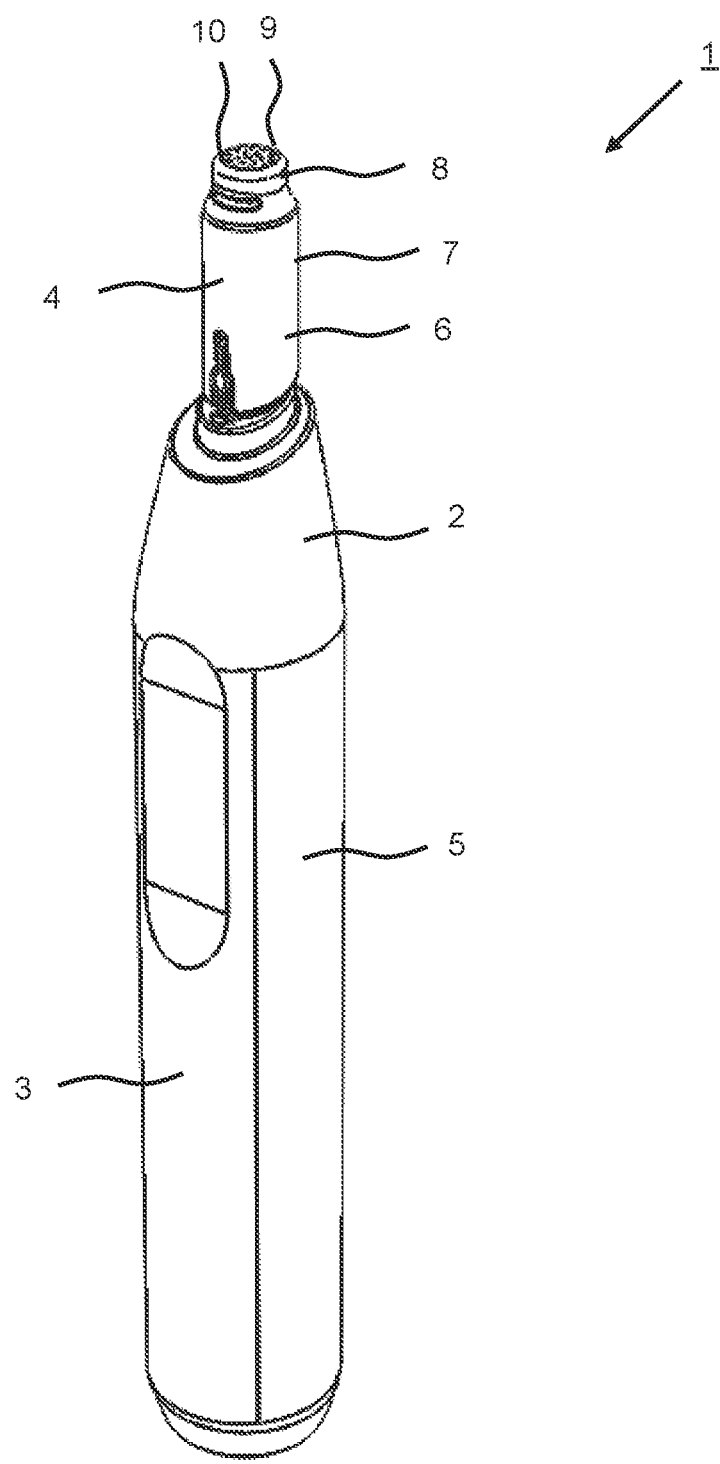
FIG. 1 is a schematic perspective representation of a hand-held microneedling device.
Figure 2:
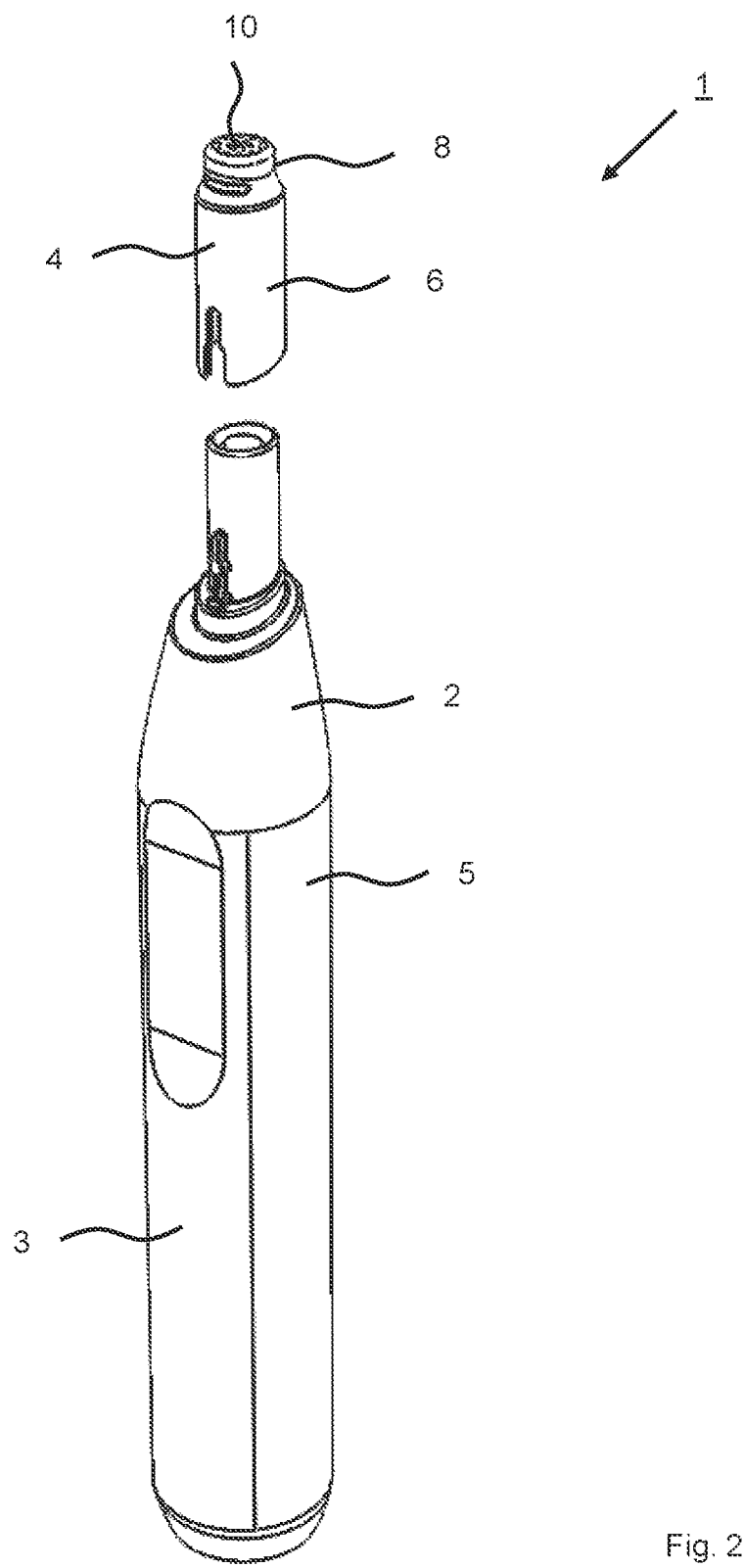
FIG. 2 is a schematic perspective representation of the hand-held microneedling device from FIG. 1, a puncturing module having a microneedling puncturing tool being detached.
Figure 3:
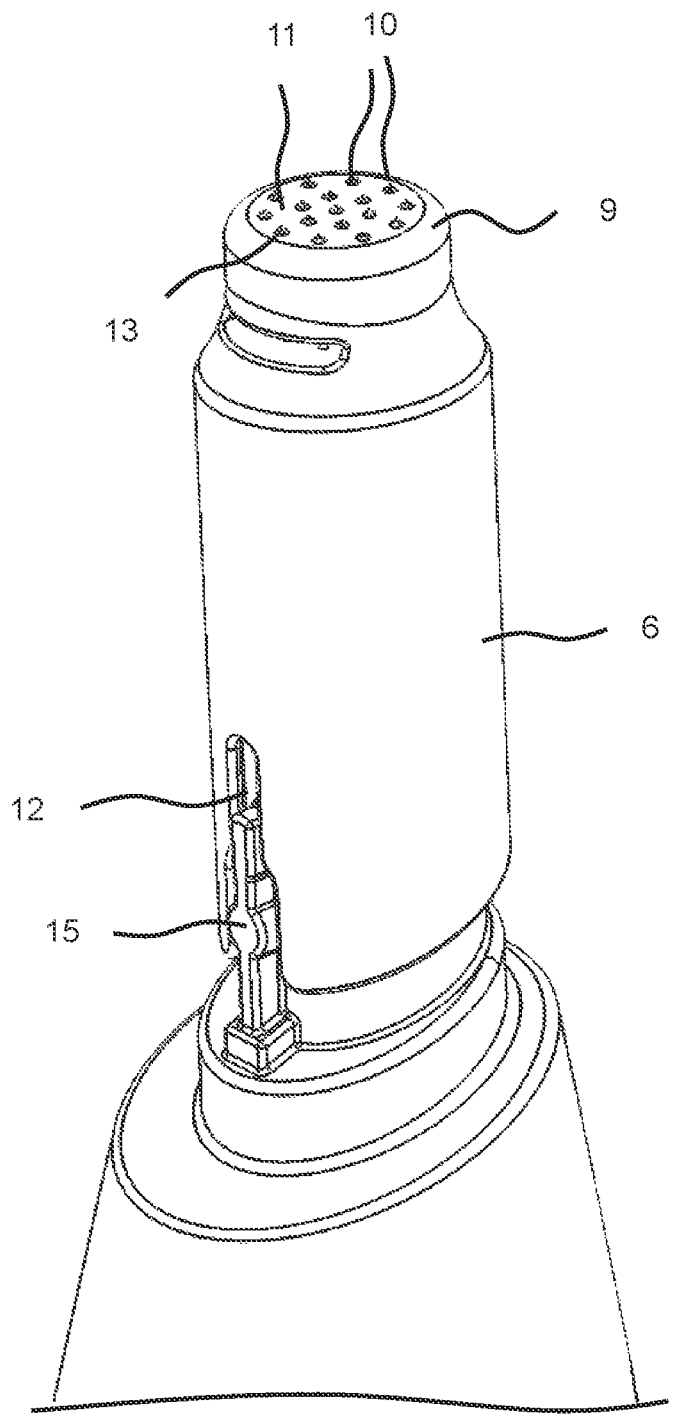
FIG. 3 is a schematic perspective representation of a front portion of the hand-held microneedling device from FIG. 1, the microneedling puncturing tool having the needle plate being arranged in a front working position.

FIGS. 1 to 7 are perspective representations of a hand-held microneedling device 1 which has a housing 2 which in the example shown is configured in several parts. The housing 2 is formed with a rear housing part 3 and a front housing part 4, which are associated with a drive module 5 and a skin puncturing device 6 which is detachably arranged thereon and with which a puncturing module 7 is optionally formed. According to FIG. 2, the skin puncturing device 6 and thus optionally the puncturing module 7 are removable from the drive module 5 and are thus exchangeable. In the example shown, the drive module 5 and skin puncturing device 6 are detachably connected by a plug connection.

Figure 4:
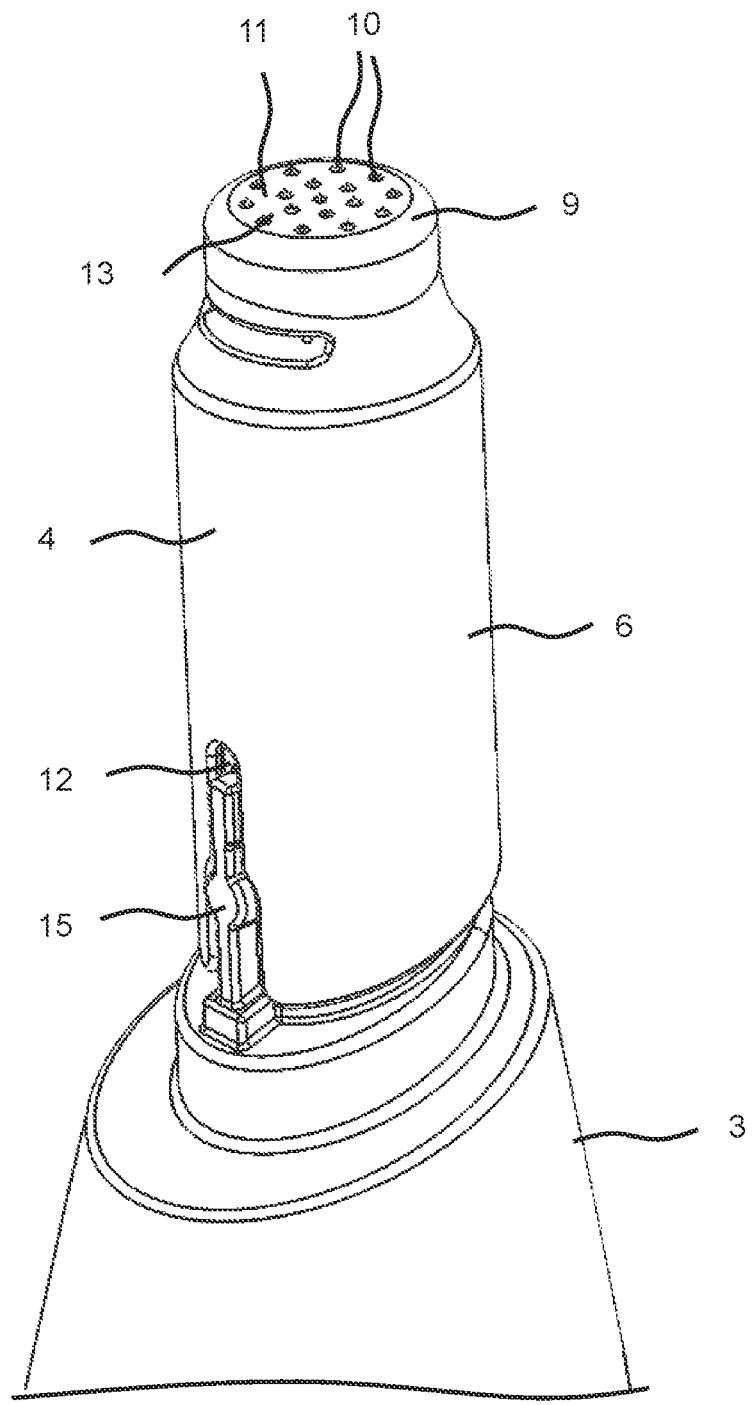
FIG. 4 is a schematic perspective representation of the front portion of the hand-held microneedling device, the microneedling puncturing tool having the needle plate being arranged in a retracted rear working position.

In the rear housing part 3, which is associated with the drive module 5, a drive device is arranged, for example an electric motor, with which a drive movement or force is provided, which drive movement or force is coupled to a microneedling puncturing tool 8 of the skin puncturing device 6, in order to move the microneedling puncturing tool 8 back and forth in the longitudinal direction of the housing 2 at a repetition rate by means of the drive force provided. In this way, the microneedling puncturing tool 8 which is formed with a needle plate 9 is repetitively displaced according to FIGS. 3 and 4 between a front working position (FIG. 3) and a rear working position (FIG. 4). In this way, during operation, a plurality of puncturing needles 10 that protrude from the needle plate 9 in the region of an application surface 11 are locally punctured into an associated portion of skin and withdrawn again. The needle plate 9 having the plurality of puncturing needles 10 is arranged in an exposed manner both in the front and in the rear working position according to FIGS. 3 and 4, i.e. in particular not completely or partially surrounded by a portion of the housing 2 and thus outside an interior space 12 of the housing 2. In this way, the local portion of skin which comes into contact with the plurality of puncturing needles 10 can vibrate freely due to the back and forth movement of the microneedling puncturing tool 8 having the needle plate 9, which supports efficient and painless puncturing of the skin.

In the example shown, the plurality of puncturing needles 10 are arranged in associated openings 13 in the region of the application surface 11 on the needle plate 9 and are fixed therein, for example by means of gluing or soldering. In another embodiment, the plurality of puncturing needles 10 can be placed on the application surface 11, for example by means of welding. Alternatively, the puncturing needles 10 can be formed thereon by means of an injection molding process or can be integrated as insert components. Above the application surface 11, the plurality of puncturing needles can all have substantially the same needle length or different needle lengths, it being possible for groups of the plurality of puncturing needles 10 to have the same needle length.

In the example shown in FIGS. 1 to 7, the skin puncturing device 6, and thus optionally the puncturing module 7, is/are plugged on by means of a coupling 14 which is formed with a drive-side coupling part 14a and a piercing tool-side coupling part 14b. The coupling 14 is configured, for example, as a magnetic coupling between the drive-side coupling part 14a and the piercing tool-side coupling part 14b (cf. FIG. 6). The initiation of the drive force/movement for moving the needle plate 9 with the puncturing needles 10 back and forth takes place via the coupling 14.

In the example shown, an anti-twist device 15 is provided, which secures the puncturing module or puncturing tool module 6 against twisting.

Figure 5:
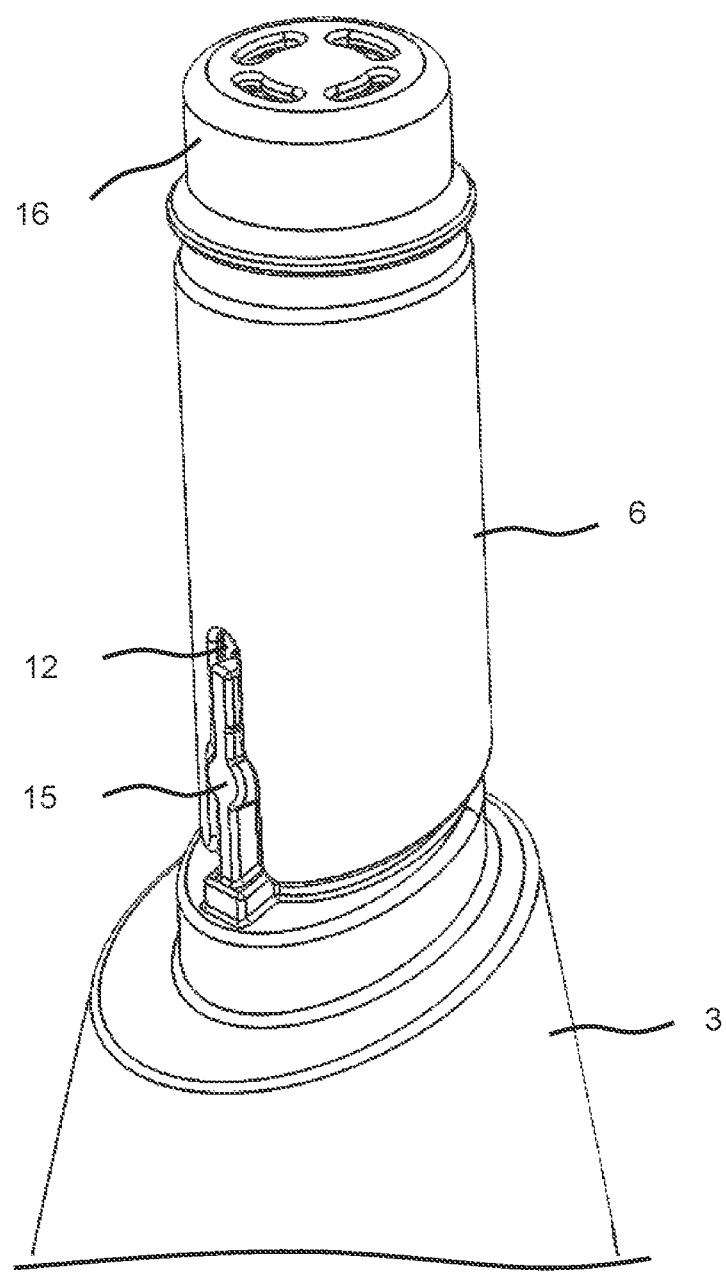
FIG. 5 is a schematic perspective representation of the front portion of the hand-held microneedling device, a cover cap being fitted on the front side of the microneedling puncturing tool, covering the needle plate.

According to FIG. 5, during non-operation, the needle plate 9 having the plurality of puncturing needles 10 can be covered by a cover cap 16 which is detachably fitted and can thus be removed for operation. In the example shown, the cover cap 16 is attached.

Figure 6:
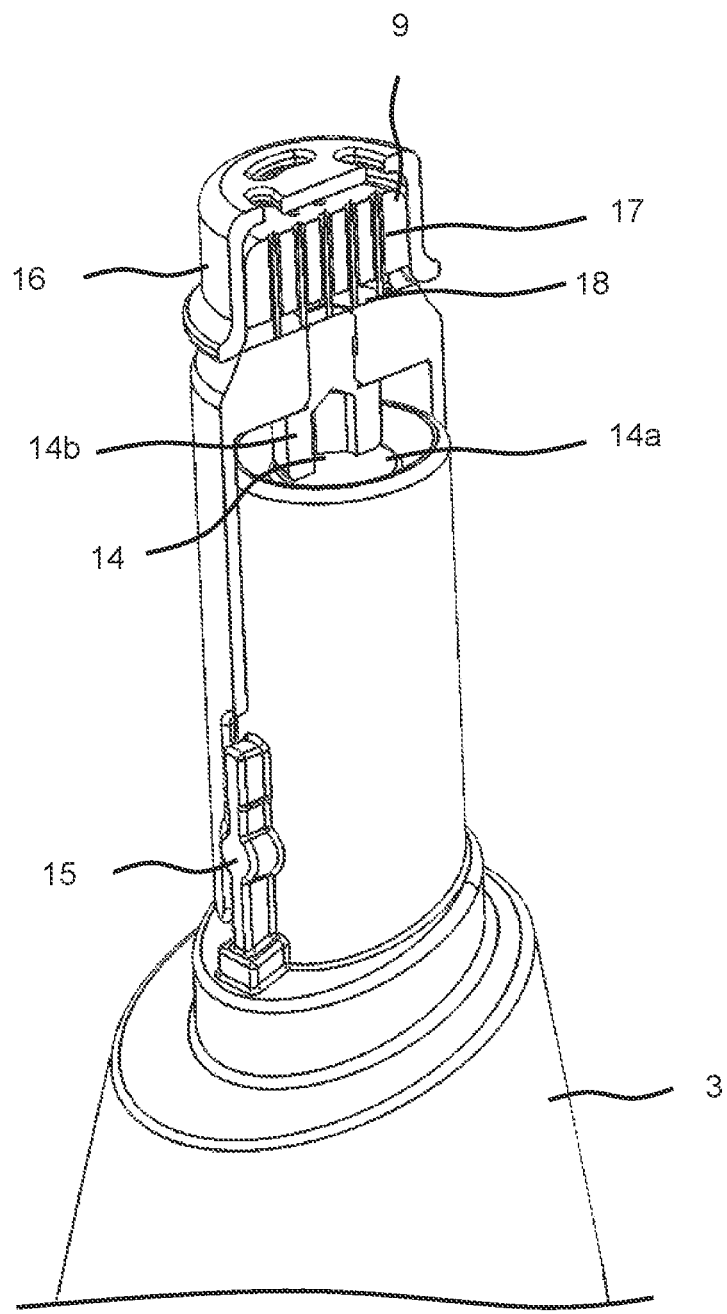
FIG. 6 is a schematic perspective representation of the front portion of the hand-held microneedling device, partially in section with the cover cap in place.
Figure 7:
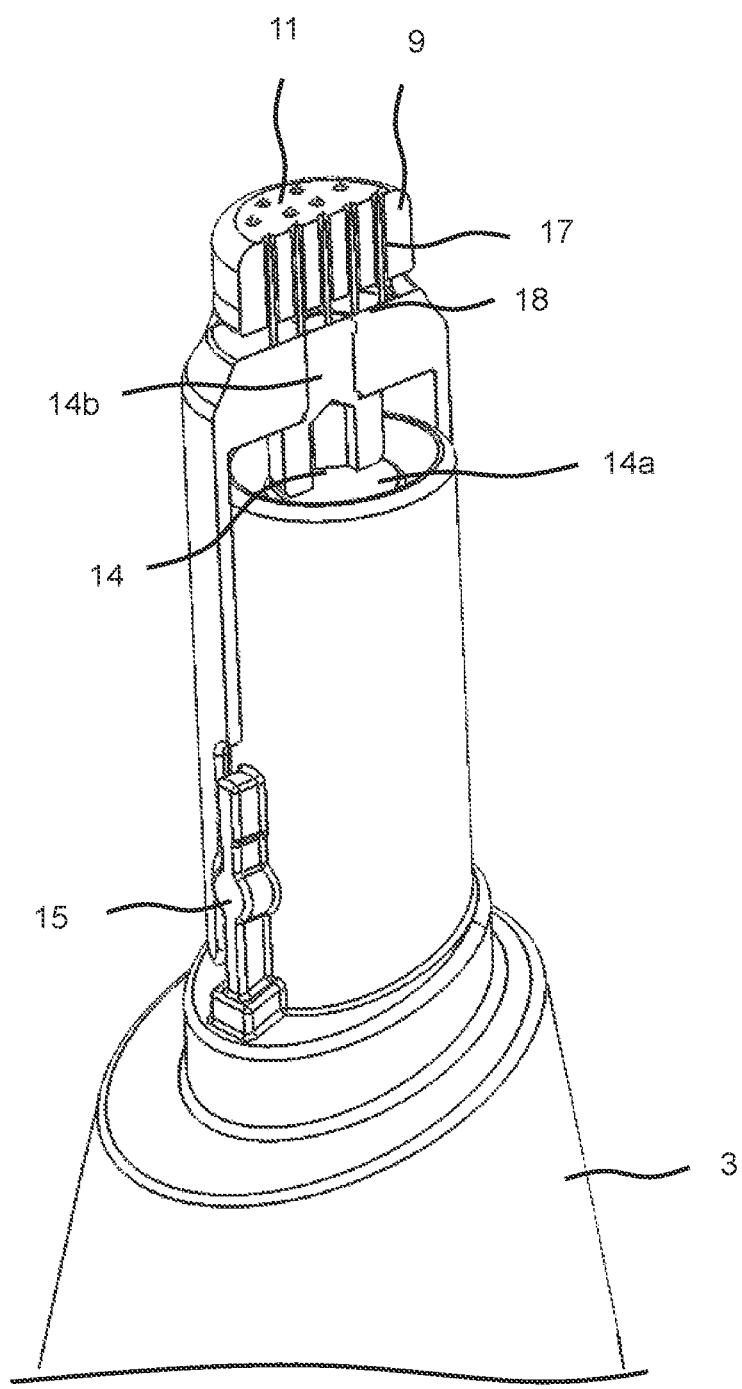
FIG. 7 is a schematic perspective representation of the front portion of the hand-held microneedling device, partially in section with the cover cap removed.

FIGS. 6 and 7 show the front portion of the hand-held microneedling device 1, partially in section, with and without the cover cap 16. The result is that the plurality of puncturing needles 10 run in associated bores 17 in the needle plate 9 and are received on a needle holder 18 on the back of the needle plate 9.

Figure 8:
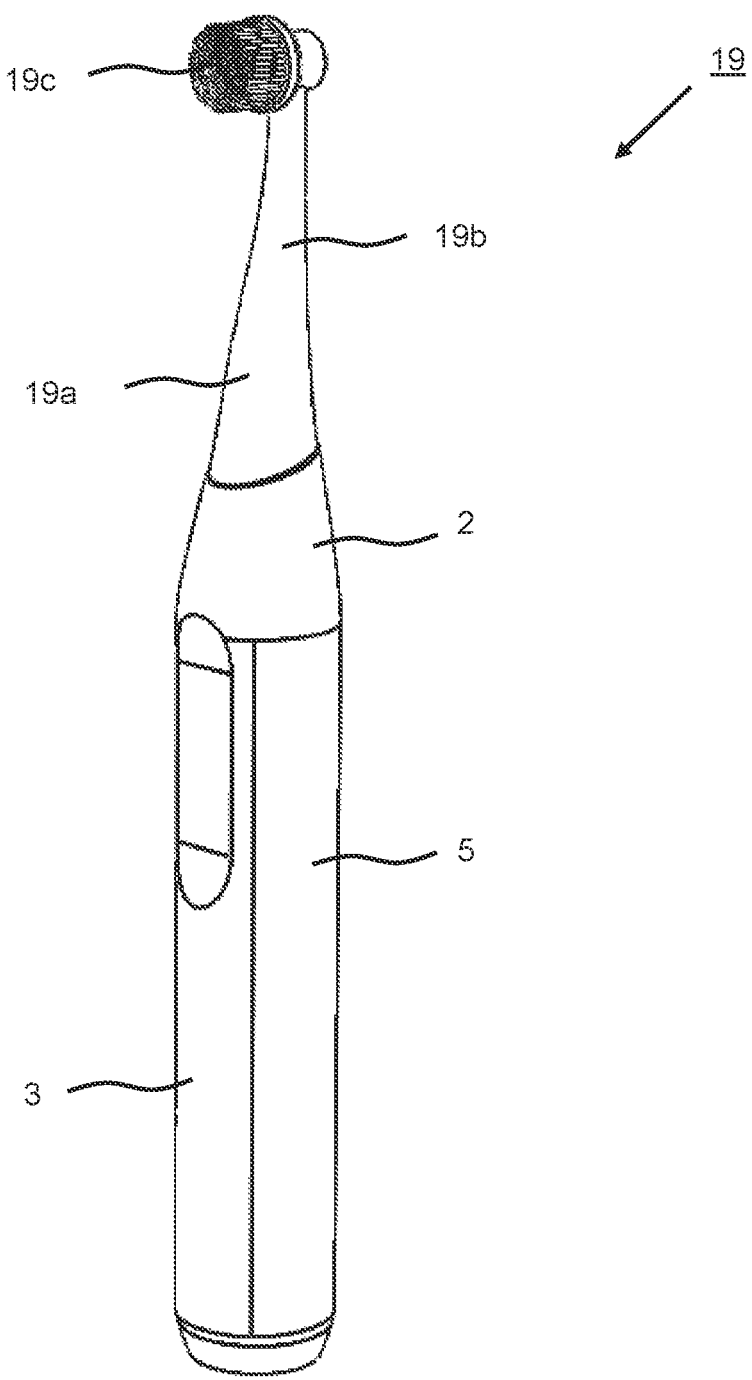
FIG. 8 is a schematic perspective representation of an electric toothbrush.

FIG. 8 is a schematic perspective representation of an electric toothbrush 19 in which a front housing part 19a is formed with a toothbrush attachment 19b which is fitted thereon instead of the skin puncturing device 6 and is coupled to the drive device in the rear housing part 3 of the housing 2, so that the drive force (back-and-forth movement) is used to move a brush assembly 19c during operation. The skin puncturing device 6 and the toothbrush attachment 19b can thus optionally be detachably fitted and be operated with one and the same drive module 5, so that either the hand-held microneedling device 1 or the electric toothbrush 19 is provided.

Figure 9:
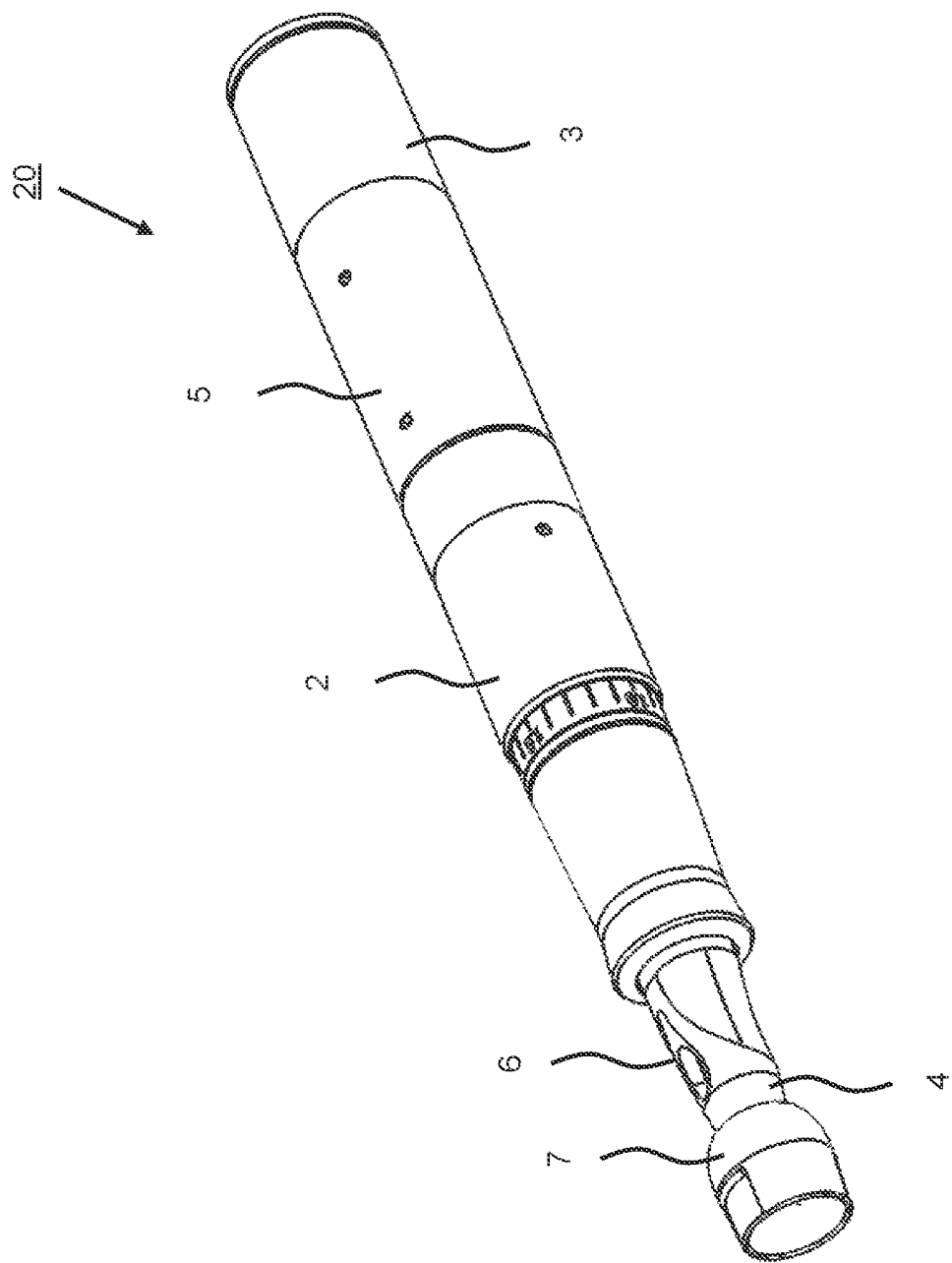
FIG. 9 is a schematic perspective representation of a further hand-held microneedling device.
Figure 10:
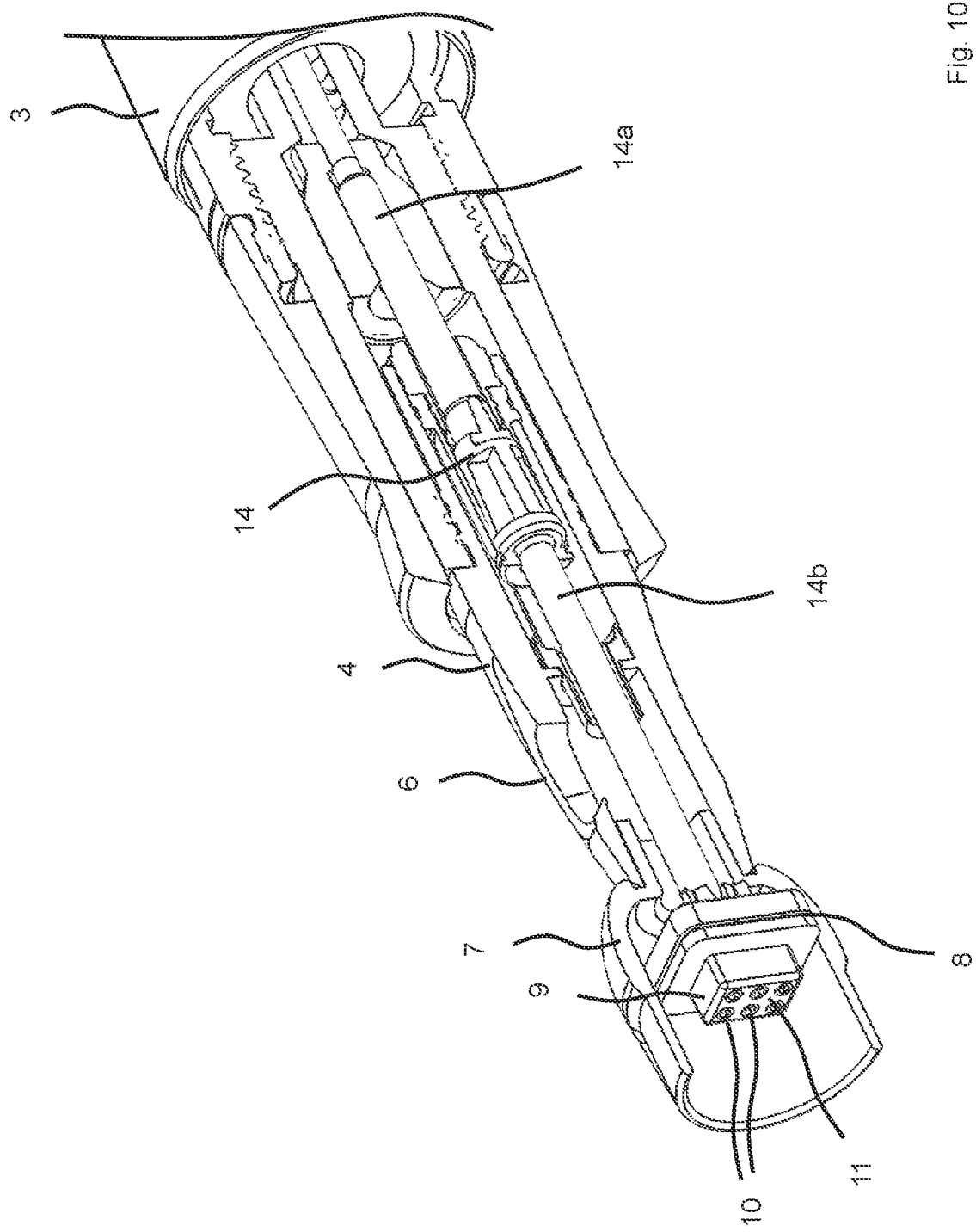
FIG. 10 is a schematic perspective representation of a front housing part of the hand-held microneedling device from FIG. 9 in section.
Figure 11:
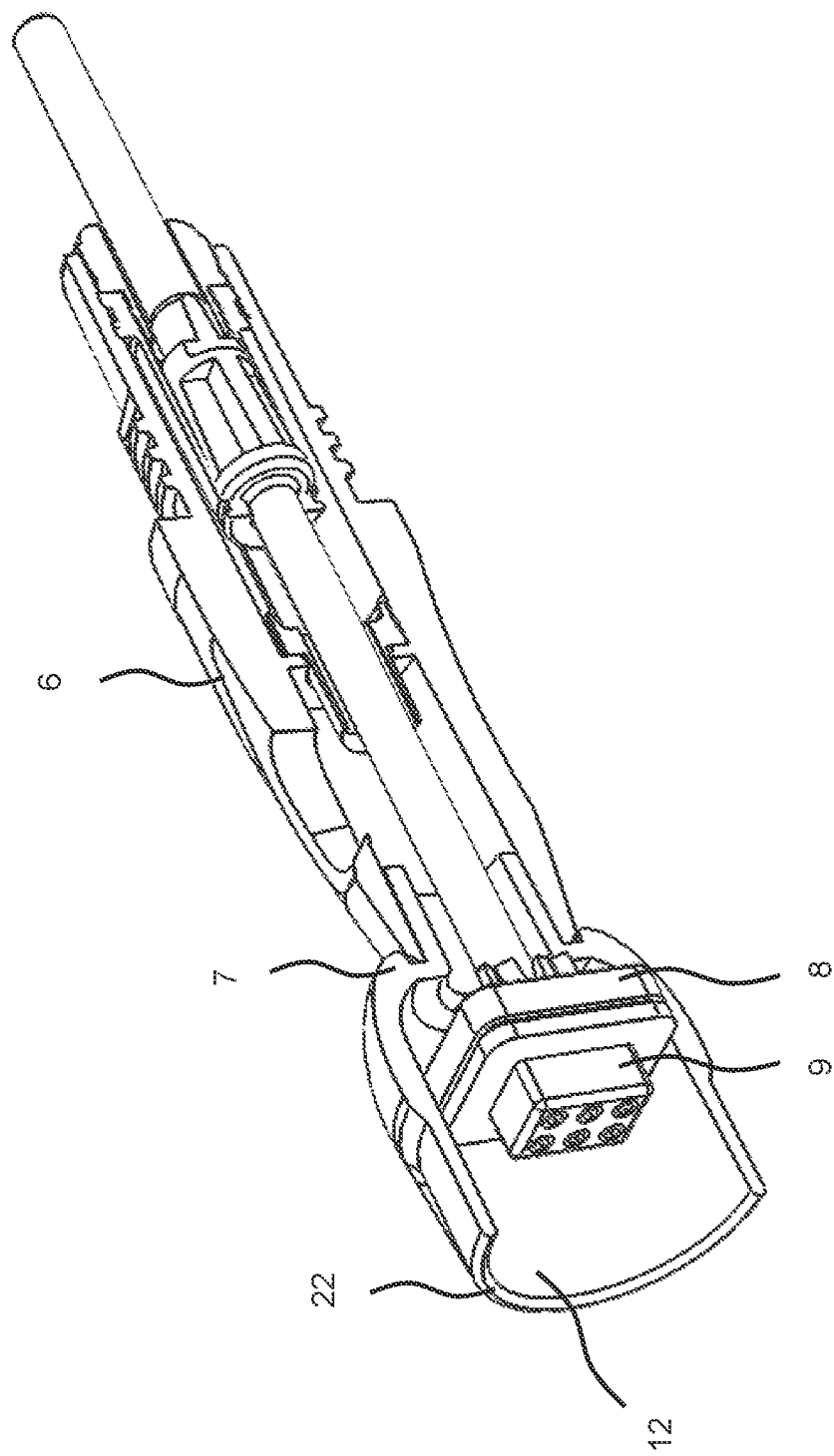
FIG. 11 is a schematic perspective representation of the front housing part of the hand-held microneedling device from FIG. 9, the needle plate of the puncturing tool being arranged in a retracted non-working position.
Figure 12:
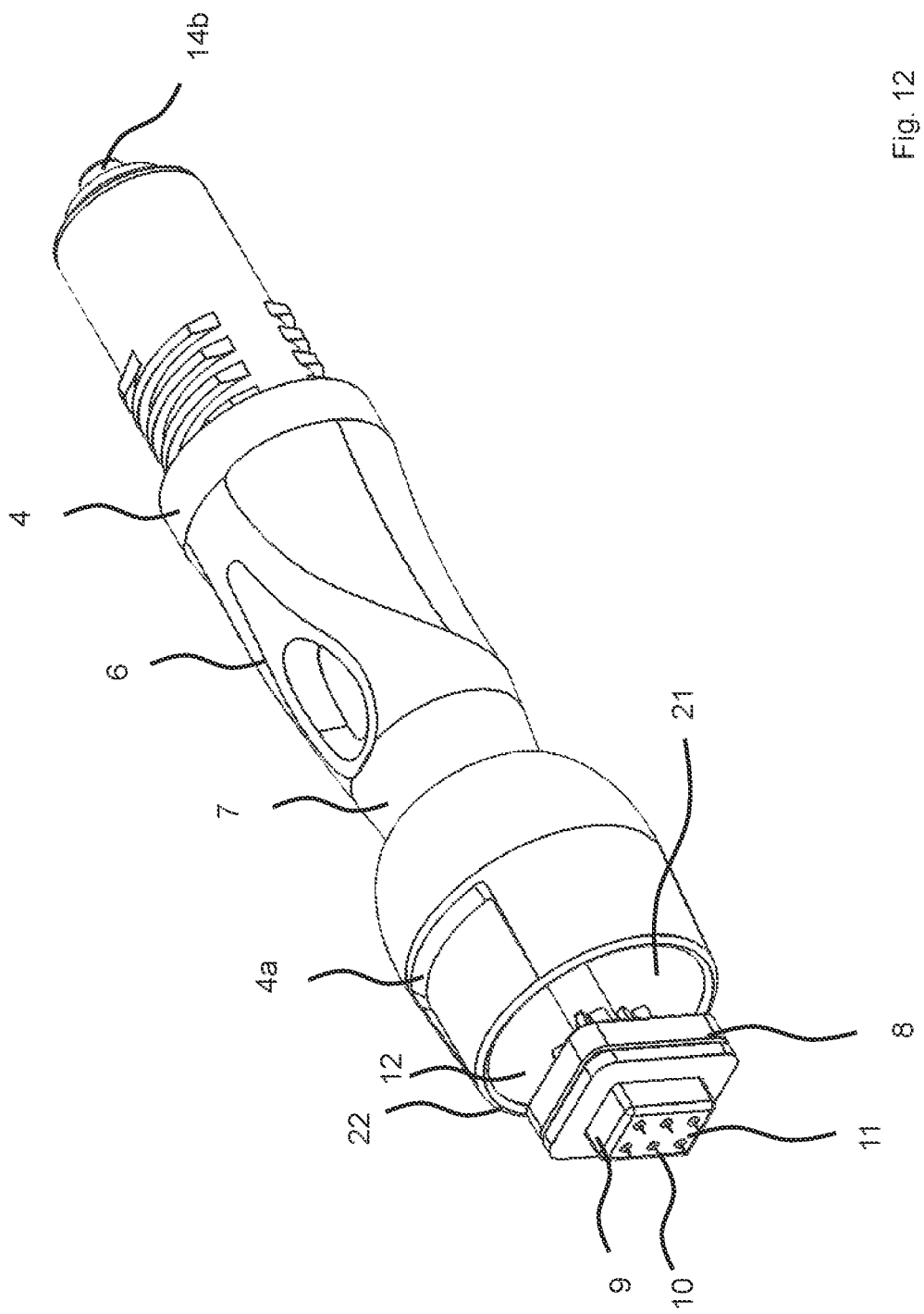
FIG. 12 is a schematic perspective representation of the front housing part of the hand-held microneedling device from FIG. 9, the needle plate of the puncturing tool in a front working position being arranged in an exposed manner.
Figure 13:
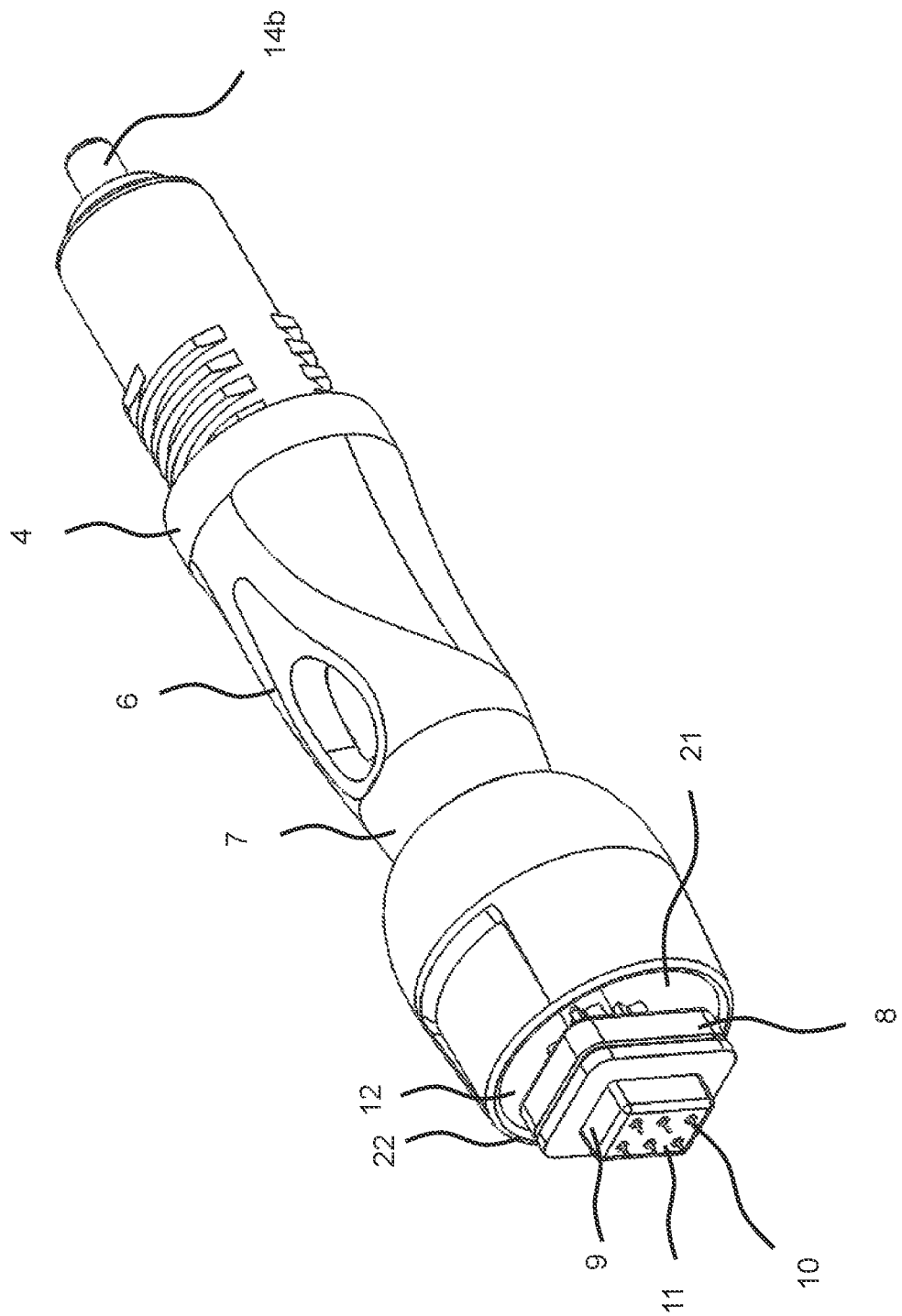
FIG. 13 is a schematic perspective representation of the front housing part of the hand-held microneedling device from FIG. 9, the needle plate in a retracted rear working position being arranged in an exposed manner.

FIGS. 9 to 13 show a further hand-held microneedling device 20 in which the microneedling puncturing tool 8 having the needle plate 9 can be displaced through a front-side housing opening 21 on the skin puncturing device 6 (puncturing module 7) between a retracted nonworking position according to FIGS. 9 to 11 and extended working positions according to FIGS. 12 and 13.

During non-operation, the needle plate 9 of the skin puncturing device 6 having the plurality of puncturing needles 10 arranged thereon can be retracted behind the surface of the housing opening 21 such that, according to FIG. 9, both the needle plate 9 and the puncturing needles 10 are arranged entirely behind the housing opening 21 in the interior space 12 of the front housing part 4 which is associated with the skin puncturing device 6 in the embodiment shown. On the front housing part 4, the housing opening 21 is formed at a front portion 4a.

During operation for microneedling, the needle plate 9 having the plurality of puncturing needles 10 according to FIGS. 12 and 13 is moved back and forth between the front working position (cf. FIG. 12) and the rear working position retracted in relation thereto (cf. FIG. 13), i.e. back and forth in the longitudinal direction of the housing 2 corresponding to a working stroke, so that the needle plate 9 having the plurality of puncturing needles 10 is arranged both in the front and in the rear working position in relation to the housing opening 21 in front of its surface and thus outside the housing 2, in particular outside the front portion 4a of the front housing part 4, which in turn allows a stimulation of the portion of skin to be treated so that it vibrates freely, i.e. without this vibration being hindered by the housing 2, in particular by a front housing edge 22 surrounding the housing opening 21. In the example shown, substantially the entire microneedling puncturing tool 8 is arranged in front of the housing opening 21 during operation. During non-operation, the needle plate 9 can then be displaced into the retracted non-working position according to FIGS. 9 to 10.

According to the example in FIGS. 9 to 13, the needle plate 9 is circumferentially and continuously at a distance from the housing edge 22, i.e. without contact, when it is passed through the housing opening 21.

It can be provided that the needle plate 9 can assume a plurality of different retracted nonworking positions within the front housing part 4 behind the housing opening 21, which positions differ in terms of their corresponding distance from the housing opening.

In the region of the coupling 14, the rear-side, puncturing tool-side coupling part 14b of the skin puncturing device 6 according to FIG. 10 is (detachably) connected to the drive-side coupling part 14a which is configured in this case as a shaft component, to couple the provided drive force/movement to the microneedling puncturing tool 8 having the needle plate 9.

Figure 14:
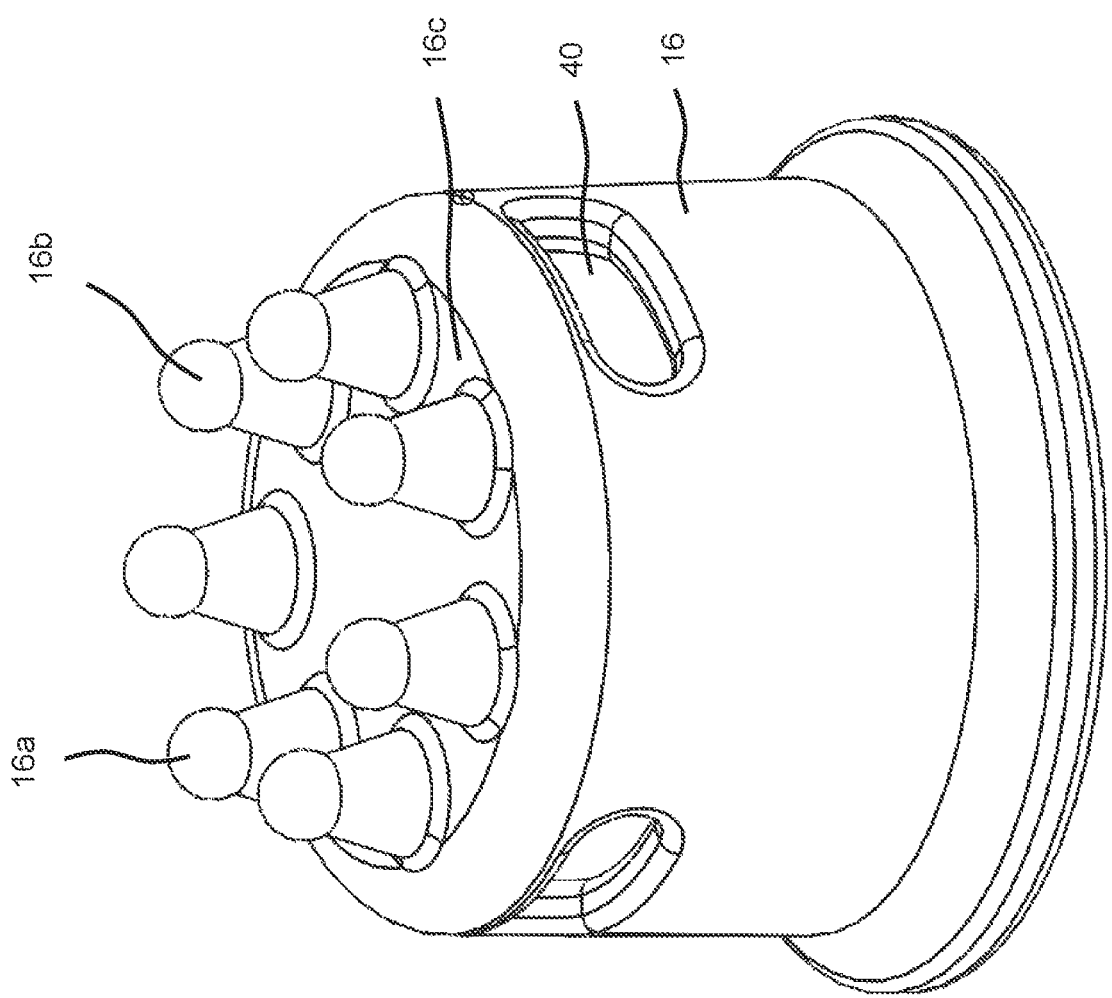
FIG. 14 is a schematic perspective representation of the cover or protective cap.

FIG. 14 is an enlarged perspective representation of another embodiment of the protective or cover cap 16 having a functional tool 16a. Openings 40 are provided on the cover cap 16. In the example shown, the openings are arranged in the region of a lateral surface 41 of the cover cap 16 and thus form lateral openings. Alternatively or additionally, in other embodiments, such openings can be arranged in the region of the front surface 16c (cf. FIG. 5). For example, the openings 40 can be used to carry out gas sterilization for the needle plate 9 having the plurality of puncturing needles 10 when the cover cap 16 is attached. The lateral openings 40 shown in FIG. 14 have the advantage that the ingress of dust particles to the needle plate 9 and dust deposits caused thereby are reduced.

On the cover cap 16 which covers the plurality of puncturing needles 10 when it is fitted, the functional tool 16a is arranged, which in the embodiment shown is formed with an arrangement of functional elements 16b which are, for example, massage elements. The cover cap 16 is thus configured as a multifunctional cap. In the embodiment shown, the functional elements 16b are configured in particular in the region of a front or end face 16c of the cover cap 16.

Alternatively, the cover cap 16 can have, at least on the outside, an inclined end face with a functional tool. The possibility for the functional tool to be folded away is also conceivable, or also an axially displaceable sleeve without missing cover surface or with a cover surface that has been broken through for the functional tool (comparable to a type of drill bit with tools on the circumference or on the remaining top surface), or the possibility for the functional tool to be switched on and off, for example, by a rotary gate cam control using a rotary slide movement.

Other functional tools can be provided on the cover cap 16, for example silicone nubs, gripping and pinching tools made of resilient material and/or alternately directed stimulation tools, which in turn achieve a puncture-like (puncture simulating) effect on the skin and thereby cause the skin to spread. Alternative functional tools for skin stimulation can be provided which differ from the aforementioned, for example with regard to a tip radius or tip angle.

In one embodiment, the needle plate 9 can be configured as a reversible plate or reversible insert, such that different functional tools can be arranged thereon in an exchangeable or detachable manner in order to provide a plurality of functions or to compensate for wear. These may also be interchangeable inserts that are detachably arranged on the needle plate 9 depending on the desired application. Reversible inserts can carry tools on both sides. The interchangeable inserts can be selected from an assortment or a graded set of tool properties.

The features disclosed in the above description, the claims, and the drawings may be of relevance, both individually and also in any combination, for implementing the various embodiments.

The invention claimed is:

1. A hand-held microneedling device for local puncturing of a skin, comprising:
   a housing;
   a drive device which is arranged in the housing and which is configured to provide a drive force;
   a skin puncturing device;
   a microneedling puncturing tool which is formed on the skin puncturing device and is connected to the drive device such that, during operation, the microneedling puncturing tool moves back and forth by means of the drive force at a repetition rate; and
   a needle plate which is formed on the microneedling puncturing tool and on which a plurality of puncturing needles are distributed over a front-side application surface,
   wherein, during operation, the microneedling puncturing tool moves back and forth by means of the drive force at the repetition rate, between a front working position and a rear working position which is retracted in comparison thereto,
   wherein the skin puncturing device is detachably arranged on the housing,
   wherein the drive device comprises an electric toothbrush drive device, and wherein the drive device is detachably couplable to operate either the skin puncturing device or to a toothbrush attachment,
   wherein a portion of the housing at least partially encompasses the needle plate with the needle plate arranged in an exposed manner outside of the housing, and
   wherein the microneedling puncturing tool together with the housing portion is detachable from the housing.

2. The hand-held microneedling device according to claim 1, wherein, during operation, at least the front-side application surface in the front working position and the retracted rear working position of the microneedling puncturing tool is arranged entirely outside the housing and is thus arranged in an exposed manner.

3. The hand-held microneedling device according to claim 1, wherein the needle plate is arranged on a housing portion of the housing which moves together with the microneedling puncturing tool when said microneedling puncturing tool moves back and forth during operation.

4. The hand-held microneedling device according to claim 1, wherein a front housing part which is associated with the skin puncturing device is provided in the form of a sleeve at the rear and at least partially encloses a rear housing part which is associated with the drive device.

5. The hand-held microneedling device according to claim 1, wherein the microneedling puncturing tool can be displaced through an opening at a front-side housing end of the housing into a non-working position which is further retracted in comparison to the retracted rear working position, in which non-working position at least the front-side application surface of the needle plate is retracted in relation to the opening.

6. The hand-held microneedling device according to claim 5, wherein, when displaced through the opening, the needle plate is, on one or more sides, at a distance from an edge surrounding the opening.

7. The hand-held microneedling device according to claim 5, wherein the needle plate, in the further retracted non-working position, is arranged in an exposed manner at a distance from housing portions of the housing surrounding the needle plate.

8. The hand-held microneedling device according to claim 1, wherein the drive device is arranged in a reusable drive module, and the skin puncturing device is arranged in a disposable module which is detachably connected to the drive module.

9. The hand-held microneedling device according to claim 1, wherein the drive device is configured to move, during operation, the microneedling puncturing tool back and forth by means of the drive force introduced thereupon at a repetition rate of between approximately 10 Hz and approximately 200 Hz.

10. A kit, comprising:
a drive device which is arranged in a housing and which is configured to provide a drive force, wherein the drive device comprises an electric toothbrush drive device;
a toothbrush attachment configured for detachable connection to the housing and thus to be coupled to the drive device to form an electric toothbrush; and
a skin puncturing device configured for detachable connection to the housing and thus to be coupled to the drive device to form a hand-held microneedling device, the skin puncturing device comprising a microneedling puncturing tool,
wherein one of the toothbrush attachment and the skin puncturing device can be connected to the housing at any one time,
wherein the skin puncturing device is connectable to the drive device such that, during operation, the microneedling puncturing tool moves back and forth by means of the drive force at a repetition rate,
wherein, during operation, the microneedling puncturing tool moves back and forth by means of the drive force at the repetition rate, between a front working position and a rear working position which is retracted in comparison thereto,
wherein a needle plate which is formed on the microneedling puncturing tool and has a plurality of puncturing needles distributed over a front-side application surface,
wherein a portion of the housing at least partially encompasses the needle plate with the needle plate arranged in an exposed manner outside of the housing, and
wherein the microneedling puncturing tool together with the housing portion is detachable from the housing.

11. The kit according to claim 10, wherein the drive device is configured to form a handpiece.

* * * * *